United States Patent
Sonobe et al.

(10) Patent No.: US 11,245,115 B2
(45) Date of Patent: Feb. 8, 2022

(54) BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

(71) Applicant: ZEON CORPORATION, Tokyo (JP)

(72) Inventors: Kenya Sonobe, Tokyo (JP); Takafumi Sekimoto, Tokyo (JP); Maki Mesuda, Tokyo (JP); Hiroki Oguro, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 256 days.

(21) Appl. No.: 16/634,858

(22) PCT Filed: Aug. 9, 2018

(86) PCT No.: PCT/JP2018/029976
§ 371 (c)(1),
(2) Date: Jan. 28, 2020

(87) PCT Pub. No.: WO2019/044452
PCT Pub. Date: Mar. 7, 2019

(65) Prior Publication Data
US 2020/0235398 A1 Jul. 23, 2020

(30) Foreign Application Priority Data
Aug. 29, 2017 (JP) .............................. JP2017-164857

(51) Int. Cl.
*H01M 4/62* (2006.01)
*H01M 10/0525* (2010.01)
*H01M 4/131* (2010.01)
*H01M 4/136* (2010.01)
*C08F 220/18* (2006.01)

(52) U.S. Cl.
CPC ....... *H01M 4/622* (2013.01); *H01M 10/0525* (2013.01); *C08F 220/1804* (2020.02); *H01M 4/131* (2013.01); *H01M 4/136* (2013.01)

(58) Field of Classification Search
CPC .................................................. H01M 4/622
See application file for complete search history.

(56) References Cited

U.S. PATENT DOCUMENTS

| | | |
|---|---|---|
| 2008/0003506 A1 | 1/2008 | Suzuki et al. |
| 2013/0330622 A1 | 12/2013 | Sasaki |
| 2020/0235395 A1* | 7/2020 | Yoon .................... C09D 125/10 |
| 2020/0331234 A1* | 10/2020 | Wakizaka ................ B32B 3/14 |
| 2020/0381734 A1* | 12/2020 | Hiraishi ................ C08F 220/18 |
| 2021/0043928 A1* | 2/2021 | Yamamoto .......... H01M 50/489 |
| 2021/0104748 A1* | 4/2021 | Park .................... H01M 4/1395 |

FOREIGN PATENT DOCUMENTS

| | | |
|---|---|---|
| JP | 2011049177 A | 3/2011 |
| JP | 2013206598 A | 10/2013 |
| JP | 2017120708 A | 7/2017 |
| WO | 2012115096 A1 | 8/2012 |

OTHER PUBLICATIONS

Mar. 3, 2020, International Preliminary Report on Patentability issued in the International Patent Application No. PCT/JP2018/029976.

Apr. 26, 2021, the Extended European Search Report issued by the European Patent Office in the corresponding European Patent Application No. 18851723.9.

* cited by examiner

*Primary Examiner* — Amanda C. Walke
(74) *Attorney, Agent, or Firm* — Kenja IP Law PC

(57) ABSTRACT

A binder composition for a non-aqueous secondary battery electrode contains an organic solvent and a binder that includes a polymer A including an ethylenically unsaturated acid monomer unit in a proportion of not less than 1.00 mass % and not more than 10.00 mass %. The polymer A has a viscosity of 10,000 mPa·s or less at a shear rate of 0.1 s$^{-1}$ when mixed with the organic solvent in a concentration of 8 mass % to obtain a mixture.

10 Claims, No Drawings

BINDER COMPOSITION FOR NON-AQUEOUS SECONDARY BATTERY ELECTRODE, SLURRY COMPOSITION FOR NON-AQUEOUS SECONDARY BATTERY ELECTRODE, ELECTRODE FOR NON-AQUEOUS SECONDARY BATTERY, AND NON-AQUEOUS SECONDARY BATTERY

TECHNICAL FIELD

The present disclosure relates to a binder composition for a non-aqueous secondary battery electrode, a slurry composition for a non-aqueous secondary battery electrode, an electrode for a non-aqueous secondary battery, and a non-aqueous secondary battery.

BACKGROUND

Non-aqueous secondary batteries such as lithium ion secondary batteries have characteristics such as compact size, light weight, high energy-density, and the ability to be repeatedly charged and discharged, and are used in a wide range of applications. Consequently, in recent years, studies have been made to improve electrodes and other battery components with the aim of achieving even higher non-aqueous secondary battery performance.

An electrode used in a non-aqueous secondary battery (hereinafter, also referred to simply as a "secondary battery") such as a lithium ion secondary battery normally includes a current collector and an electrode mixed material layer (positive electrode mixed material layer or negative electrode mixed material layer) that is formed on the current collector. This electrode mixed material layer is formed by, for example, applying a slurry composition containing an electrode active material, a binder-containing binder composition, and so forth onto the current collector, and then drying the applied slurry composition.

In order to further improve the performance of secondary batteries, attempts have been made in recent years to improve binder compositions used in electrode mixed material layer formation.

In one example, Patent Literature (PTL) 1 proposes that an electrical accumulator having high rate characteristics can be produced using a composition (binder composition) for an electrical accumulator electrode obtained by mixing an electrolyte solution-soluble compound, an acrylic polymer or the like as a binder, and an organic solvent such as N-methyl-2-pyrrolidone as a solvent. In another example, PTL 2 proposes a binder composition obtained by dispersing, in an organic dispersion medium, a binder formed by a copolymer of an ethylenically unsaturated carboxylic acid ester monomer and another ethylenically unsaturated monomer that is copolymerizable with the ethylenically unsaturated carboxylic acid ester monomer. The binder composition according to PTL 2 enables a large quantity of an active material to be fixed in an electrode while also ensuring that functionality of the active material is not lost.

CITATION LIST

Patent Literature

PTL 1: JP 2017-120708 A
PTL 2: JP 2011-049177 A

SUMMARY

Technical Problem

An electrode mixed material layer of a secondary battery contains an electrode active material. From a viewpoint of enabling good formation of the electrode mixed material layer and improving performance of a secondary battery, a slurry composition that can contain solid content such as the electrode active material in high concentration and that can enhance battery characteristics of the secondary battery including the obtained electrode mixed material layer is required.

However, there have been cases in which it has not been possible to compound an electrode active material or the like with a sufficient concentration in a slurry composition formed using a conventional binder composition such as described above because gelation of the binder, for example, may occur in the slurry composition, and the viscosity of the slurry composition may become excessively high. Moreover, when slurry compositions formed using conventional binder compositions have been used, there have been cases in which it has not been possible to obtain sufficiently high binding capacity in an obtained electrode mixed material layer, and in which the peel strength of the electrode mixed material layer has been inadequate. Therefore, there is room for further improvement of battery characteristics of a secondary battery including an electrode mixed material layer that is obtained with a slurry composition formed using such a conventional binder composition.

Accordingly, an objective of the present disclosure is to provide a binder composition for a non-aqueous secondary battery electrode that when used in production of a slurry composition for a non-aqueous secondary battery electrode, enables a higher solid content concentration in the slurry composition.

Another objective of the present disclosure is to provide a slurry composition for a non-aqueous secondary battery electrode that has a high solid content concentration and can form an electrode mixed material layer having excellent peel strength.

Yet another objective of the present disclosure is to provide an electrode for a non-aqueous secondary battery that can sufficiently improve battery characteristics of a non-aqueous secondary battery and also to provide a non-aqueous secondary battery that has excellent battery characteristics such as rate characteristics and cycle characteristics.

Solution to Problem

The inventors conducted diligent investigation with the aim of solving the problems set forth above. The inventors discovered that a slurry composition having a high solid content concentration can be obtained by using a binder composition for a secondary battery electrode that contains an organic solvent and a polymer that includes an ethylenically unsaturated acid monomer unit in a specific proportion and that has a viscosity that is not more than a specific upper limit when dispersed in organic solvent in a specific concentration. The inventors also discovered that a slurry composition for a secondary battery electrode produced using this binder composition for a secondary battery electrode can form an electrode mixed material layer having excellent peel strength. The inventors completed the present disclosure based on these findings.

Specifically, the present disclosure aims to advantageously solve the problems set forth above by disclosing a binder composition for a non-aqueous secondary battery electrode comprising a binder and an organic solvent, wherein the binder includes a polymer A, the polymer A includes an ethylenically unsaturated acid monomer unit in a proportion of not less than 1.00 mass % and not more than 10.00 mass %, and the polymer A has a viscosity of 10,000 mPa·s or less at a shear rate of $0.1\ s^{-1}$ when mixed with the organic solvent in a concentration of 8 mass % to obtain a mixture. A binder composition for a non-aqueous secondary battery electrode containing a polymer A that includes an ethylenically unsaturated acid monomer unit in a proportion of not less than 1.00 mass % and not more than 10.00 mass % and that yields a mixture having a viscosity of 10,000 mPa·s or less at a shear rate of $0.1\ s^{-1}$ when mixed with organic solvent in a concentration of 8 mass % as set forth above enables a sufficiently high solid content concentration when used in production of a slurry composition for a non-aqueous secondary battery electrode.

The "proportion constituted by a repeating unit (monomer unit) in a copolymer" referred to in the present disclosure can be measured by a nuclear magnetic resonance (NMR) method such as $^1$H-NMR. Moreover, the phrase "including a monomer unit" as used in the present disclosure means that "a repeating unit derived from the monomer is included in a polymer obtained using that monomer". Also note that the viscosity at a shear rate of $0.1\ s^{-1}$ of a mixture obtained by mixing a polymer A with organic solvent in a concentration of 8 mass % can be measured by a method described in the EXAMPLES section.

In the presently disclosed binder composition for a non-aqueous secondary battery electrode, the polymer A preferably includes a cross-linkable monomer unit in a proportion of not less than 0.01 mass % and not more than 5.00 mass %. When the polymer A includes a cross-linkable monomer unit in a proportion of not less than 0.01 mass % and not more than 5.00 mass %, pressability of an electrode mixed material layer formed using a slurry composition for a non-aqueous secondary battery electrode that contains the binder composition for a non-aqueous secondary battery electrode can be increased.

Moreover, in the presently disclosed binder composition for a non-aqueous secondary battery electrode, the polymer A preferably includes a (meth)acrylic acid ester monomer unit in a proportion of not less than 30.00 mass % and not more than 98.00 mass %. When the polymer A includes a (meth)acrylic acid ester monomer unit in a proportion of not less than 30.00 mass % and not more than 98.00 mass %, an increase in internal resistance of a secondary battery due to an electrode mixed material layer formed using a slurry composition for a non-aqueous secondary battery electrode that contains the binder composition for a non-aqueous secondary battery electrode can be suppressed, and battery characteristics of the obtained secondary battery can be further improved.

Furthermore, in the presently disclosed binder composition for a non-aqueous secondary battery electrode, insoluble content of the polymer A when the polymer A is mixed with N-methyl-2-pyrrolidone in a concentration of 8 mass % is preferably not less than 70 mass % and not more than 100 mass %. When the polymer A is insoluble in N-methyl-2-pyrrolidone, rate characteristics and cycle characteristics of a non-aqueous secondary battery including an electrode mixed material layer formed using a slurry composition for a non-aqueous secondary battery electrode that contains the binder composition for a non-aqueous secondary battery electrode can be enhanced. In the present disclosure, the insoluble content of a polymer A when the polymer A is mixed with N-methyl-2-pyrrolidone in a concentration of 8 mass % (hereinafter, also referred to simply as the "NMP-insoluble content") can be measured by a method described in the EXAMPLES section.

Also, in the presently disclosed binder composition for a non-aqueous secondary battery electrode, the polymer A preferably has a volume-average particle diameter of not less than 100 nm and not more than 1,000 nm. When the polymer A has a volume-average particle diameter of not less than 100 nm and not more than 1,000 nm, the peel strength of an electrode mixed material layer formed using a slurry composition for a non-aqueous secondary battery electrode that contains the binder composition for a non-aqueous secondary battery electrode can be increased, and rate characteristics and cycle characteristics of a non-aqueous secondary battery that includes the electrode mixed material layer can be further enhanced. The "volume-average particle diameter of a polymer A" referred to in the present disclosure is the particle diameter of the polymer A in organic solvent and indicates the particle diameter (D50) at which, in a particle diameter distribution (volume basis) measured by laser diffraction/scattering in accordance with JIS Z8828, cumulative volume calculated from the small diameter end of the distribution reaches 50%.

In the presently disclosed binder composition for a non-aqueous secondary battery electrode, it is preferable that the binder further includes a polymer B and that the polymer B has a viscosity of not less than 10 mPa·s and not more than 10,000 mPa·s at a shear rate of $10\ s^{-1}$ when dissolved in the organic solvent in a concentration of 8 mass % to obtain a solution. When the viscosity of the polymer B at a shear rate of $10\ s^{-1}$ is not less than 10 mPa·s and not more than 10,000 mPa·a, solid content concentration can be sufficiently increased in production of a slurry composition for a non-aqueous secondary battery electrode. Note that the "viscosity of a polymer B" can also be measured by a method described in the EXAMPLES section.

Moreover, in the presently disclosed binder composition for a non-aqueous secondary battery electrode, insoluble content of the polymer B when the polymer B is mixed with N-methyl-2-pyrrolidone in a concentration of 8 mass % is preferably 50 mass % or less. When the polymer B is soluble in N-methyl-2-pyrrolidone, rate characteristics and cycle characteristics of a non-aqueous secondary battery including an electrode mixed material layer formed using a slurry composition for a non-aqueous secondary battery electrode that contains the binder composition for a non-aqueous secondary battery electrode can be enhanced. The NMP-insoluble content of a polymer B can also be measured by a method described in the EXAMPLES section.

The present disclosure also aims to advantageously solve the problems set forth above by disclosing a slurry composition for a non-aqueous secondary battery electrode comprising an electrode active material and any one of the binder compositions for a non-aqueous secondary battery electrode set forth above. Through compounding of an electrode active material and a binder composition for a non-aqueous secondary battery electrode that contains the polymer A set forth above, it is easy to obtain a slurry composition for a non-aqueous secondary battery electrode that has a high solid content concentration and can form an electrode mixed material layer having high peel strength.

The present disclosure also aims to advantageously solve the problems set forth above by disclosing an electrode for a non-aqueous secondary battery comprising an electrode mixed material layer formed using the slurry composition for a non-aqueous secondary battery electrode set forth above. The use of the slurry composition for a non-aqueous secondary battery electrode set forth above in this manner enables good formation of an electrode mixed material layer having high peel strength and can sufficiently improve battery characteristics of a secondary battery in which the electrode for a non-aqueous secondary battery is used.

The present disclosure also aims to advantageously solve the problems set forth above by disclosing a non-aqueous secondary battery comprising the electrode for a non-aqueous secondary battery set forth above. By using the electrode for a non-aqueous secondary battery set forth above in this manner, battery characteristics such as rate characteristics and cycle characteristics can be sufficiently improved.

Advantageous Effect

According to the present disclosure, it is possible to provide a binder composition for a non-aqueous secondary battery electrode that when used in production of a slurry composition for a non-aqueous secondary battery electrode, enables a higher solid content concentration in the slurry composition.

Moreover, according to the present disclosure, it is possible to provide a slurry composition for a non-aqueous secondary battery electrode that has a high solid content concentration and can form an electrode mixed material layer having excellent peel strength.

Furthermore, according to the present disclosure, it is possible to provide an electrode for a non-aqueous secondary battery that can sufficiently improve battery characteristics of a non-aqueous secondary battery and also to provide a non-aqueous secondary battery that has excellent battery characteristics such as rate characteristics and cycle characteristics.

DETAILED DESCRIPTION

The following provides a detailed description of embodiments of the present disclosure.

The presently disclosed binder composition for a non-aqueous secondary battery electrode can be used in production of a slurry composition for a non-aqueous secondary battery electrode. Moreover, a slurry composition for a non-aqueous secondary battery electrode produced using the presently disclosed binder composition for a non-aqueous secondary battery electrode can be used in formation of an electrode of a non-aqueous secondary battery such as a lithium ion secondary battery. Furthermore, the presently disclosed non-aqueous secondary battery includes an electrode for a non-aqueous secondary battery formed using the presently disclosed slurry composition for a non-aqueous secondary battery electrode.

Note that the presently disclosed binder composition for a non-aqueous secondary battery electrode and slurry composition for a non-aqueous secondary battery electrode are particularly suitable for use in formation of a positive electrode of a non-aqueous secondary battery.

(Binder Composition for Secondary Battery Electrode)

The presently disclosed binder composition for a non-aqueous secondary battery electrode is a binder composition for a non-aqueous secondary battery electrode that contains a binder and an organic solvent. One feature of the presently disclosed binder composition for a non-aqueous secondary battery electrode is that the binder includes a polymer A that includes an ethylenically unsaturated acid monomer unit in a proportion of not less than 1.00 mass % and not more than 10.00 mass % and that has a viscosity of 10,000 mPa·s or less at a shear rate of 0.1 s$^{-1}$ when mixed with organic solvent in a concentration of 8 mass % to obtain a mixture. The presently disclosed binder composition for a non-aqueous secondary battery electrode preferably contains a polymer B in addition to the polymer A. Moreover, the presently disclosed binder composition for a non-aqueous secondary battery electrode may contain any other components in addition to the polymer A and the polymer B.

When the presently disclosed binder composition for a non-aqueous secondary battery electrode (hereinafter, also referred to simply as a "binder composition") is used to produce a slurry composition for a non-aqueous secondary battery electrode (hereinafter, also referred to simply as a "slurry composition") and to form an electrode mixed material layer, the presently disclosed binder composition can sufficiently increase the peel strength of the electrode mixed material layer as a result of the polymer A including an ethylenically unsaturated acid monomer unit in a proportion of not less than 1.00 mass % and not more than 10.00 mass %. Moreover, when the presently disclosed binder composition is used to produce a slurry composition and to form a non-aqueous secondary battery, the presently disclosed binder composition can enhance electrical characteristics such as rate characteristics and cycle characteristics of the obtained non-aqueous secondary battery as a result of containing, as a binder, the polymer A that has a viscosity of 10,000 mPa·s or less at a shear rate of 0.1 s$^{-1}$ when mixed with organic solvent in a concentration of 8 mass % to obtain a mixture. Although the reason for this is not clear, it is presumed to be as follows.

Specifically, it is presumed that by adjusting the viscosity of the polymer A in organic solvent so as to not exceed the upper limit set forth above, the viscosity of a slurry composition does not excessively increase due to the polymer A, and the amount of solid components in the slurry composition can be increased. It is necessary for the slurry composition to have good coatability in formation of an electrode mixed material layer. However, coatability decreases if the slurry composition has an excessively high viscosity, while, on the other hand, it is necessary for components such as an electrode active material to be contained with a suitably high density in an electrode mixed material layer formed using the slurry composition from a viewpoint of improving battery characteristics of a non-aqueous secondary battery. Therefore, it is necessary for components such as an electrode active material to be contained in the slurry composition in a high concentration while also avoiding increasing the viscosity of the slurry composition to a level that causes loss of coatability. It is presumed that as a result of the polymer A contained in the presently disclosed binder composition displaying a viscosity such as set forth above, when the polymer A is used in production of a slurry composition, an excessive increase of viscosity of the slurry composition can be avoided, and a slurry composition having a sufficiently high solid content concentration can be provided.

<Polymer A>

The polymer A is a component that does not excessively increase the viscosity of the binder composition or a slurry composition produced using the binder composition. Moreover, in an electrode produced by forming an electrode mixed material layer on a current collector using a slurry composition that contains the binder composition, the polymer A is a component that holds components contained in the electrode mixed material layer so that these components do not detach from the electrode mixed material layer (i.e., functions as a binder).

The polymer A is required to include an ethylenically unsaturated acid monomer unit as a repeating unit and preferably includes either or both of a cross-linkable monomer unit and a (meth)acrylic acid ester monomer unit as a repeating unit.

[Ethylenically Unsaturated Acid Monomer Unit]

The ethylenically unsaturated acid monomer unit is a repeating unit that is derived from an ethylenically unsaturated acid monomer. The polymer A can display excellent binding force as a result of including the ethylenically unsaturated acid monomer unit. Consequently, an electrode mixed material layer that is formed using a slurry composition containing the presently disclosed binder composition can display excellent peel strength. The term "ethylenically unsaturated acid monomer unit" as used in the present specification refers to a unit of monomer that includes an ethylenically unsaturated bond and an acidic group.

Examples of ethylenically unsaturated acid monomers that can form the ethylenically unsaturated acid monomer unit include monomers, and more specifically carboxy group-containing monomers, sulfo group-containing monomers, and phosphate group-containing monomers, for which the number of ethylenically unsaturated bonds in a single molecule is 1.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxy group through hydrolysis can also be used as a carboxy group-containing monomer.

Examples of sulfo group-containing monomers include styrene sulfonic acid, vinyl sulfonic acid, methyl vinyl sulfonic acid, (meth)allyl sulfonic acid, 3-allyloxy-2-hydroxypropane sulfonic acid, and 2-acrylamido-2-methylpropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

One of these ethylenically unsaturated acid monomers may be used individually, or two or more of these ethylenically unsaturated acid monomers may be used in combination. Of these ethylenically unsaturated acid monomers, acrylic acid, methacrylic acid, itaconic acid, maleic acid, and fumaric acid are preferable, and acrylic acid and methacrylic acid are more preferable from a viewpoint of further improving the peel strength of an obtained electrode mixed material layer.

The fractional content of the ethylenically unsaturated acid monomer unit in the polymer A when all repeating units in the polymer A are taken to be 100.00 mass % is required to be not less than 1.00 mass % and not more than 10.00 mass %, and is more preferably not less than 1.50 mass % and not more than 8.00 mass %, even more preferably not less than 2.00 mass % and not more than 6.00 mass %, and particularly preferably not less than 3.00 mass % and not more than 5.00 mass %. When the fractional content of the ethylenically unsaturated acid monomer unit is not less than any of the lower limits set forth above, the peel strength of an electrode mixed material layer that is formed using a slurry composition containing the binder composition can be increased. In particular, when the fractional content of the ethylenically unsaturated acid monomer unit is not more than any of the upper limits set forth above, flexibility of the polymer A can be improved, and this can improve the peel strength and pressability of an obtained electrode mixed material layer.

[Cross-Linkable Monomer Unit]

The cross-linkable monomer unit is a repeating unit that is derived from a cross-linkable monomer. A cross-linkable monomer is a monomer that can form a cross-linked structure upon polymerization. The peel strength of an obtained electrode mixed material layer can be further increased when the polymer A includes a cross-linkable monomer unit. Examples of cross-linkable monomers include monomers including two or more reactive groups per molecule.

More specifically, the cross-linkable monomer may, for example, be a polyfunctional ethylenically unsaturated carboxylic acid ester monomer that includes two or more ethylenically unsaturated bonds.

Examples of difunctional ethylenically unsaturated carboxylic acid ester monomers including two ethylenically unsaturated bonds in a molecule include allyl acrylate, allyl methacrylate, ethylene diacrylate, ethylene dimethacrylate, 2-hydroxy-3-acryloyloxypropyl methacrylate, polyethylene glycol diacrylate, propoxylated ethoxylated bisphenol A diacrylate, ethoxylated bisphenol A diacrylate, 9,9-bis[4-(2-acryloyloxyethoxy)phenyl]fluorene, propoxylated bisphenol A diacrylate, tricyclodecane dimethanol diacrylate, 1,10-decanediol diacrylate, 1,6-hexanediol diacrylate, 1,9-nonanediol diacrylate, polypropylene glycol diacrylate, polypropylene glycol dimethacrylate, polytetramethylene glycol diacrylate, ethylene glycol dimethacrylate, diethylene glycol dimethacrylate, polyethylene glycol dimethacrylate, ethoxylated bisphenol A dimethacrylate, tricyclodecane dimethanol dimethacrylate, 1,10-decanediol dimethacrylate, 1,6-hexanediol dimethacrylate, 1,9-nonanediol dimethacrylate, neopentyl glycol dimethacrylate, ethoxylated polypropylene glycol dimethacrylate, and glycerin dimethacrylate.

Examples of trifunctional ethylenically unsaturated carboxylic acid ester monomers including three ethylenically unsaturated bonds in a molecule include ethoxylated isocyanurate triacrylate, ε-caprolactone-modified tris(2-acryloxyethyl) isocyanurate, ethoxylated glycerin triacrylate, pentaerythritol triacrylate, trimethylolpropane triacrylate, and trimethylolpropane trimethacrylate.

Examples of ethylenically unsaturated carboxylic acid ester monomers having a functionality of four or higher that include four or more ethylenically unsaturated bonds in a molecule include di(trimethylolpropane) tetraacrylate, ethoxylated pentaerythritol tetraacrylate, pentaerythritol tetraacrylate, dipentaerythritol polyacrylate, and dipentaerythritol hexaacrylate.

Of these examples, allyl methacrylate (difunctional), ethylene glycol dimethacrylate (difunctional), trimethylolpropane triacrylate (trifunctional), and ethoxylated pentaerythritol tetraacrylate (tetrafunctional) are preferable from a viewpoint of improving pressability, peel strength, flexibility, and so forth of an obtained electrode mixed material layer.

The fractional content of the cross-linkable monomer unit in the polymer A when all repeating units included in the polymer A are taken to be 100.00 mass % is preferably 0.01 mass % or more, more preferably 0.05 mass % or more, and even more preferably 0.10 mass % or more, and is preferably 5.00 mass % or less, more preferably 2.00 mass % or less, and even more preferably 1.50 mass % or less. When the fractional content of the cross-linkable monomer unit in the polymer A is not less than any of the lower limits set forth above, the peel strength of an obtained electrode mixed material layer can be further improved. Moreover, when the fractional content of the cross-linkable monomer unit in the polymer A is not more than any of the upper limits set forth above, an obtained electrode mixed material layer can be provided with good pressability, which enables effective densification of the electrode mixed material layer by pressing.

[(Meth)Acrylic Acid Ester Monomer Unit]

The (meth)acrylic acid ester monomer unit is a repeating unit that is derived from a (meth)acrylic acid ester monomer. In the present specification, "(meth)acryl" is used to indicate "acryl" or "methacryl". When the polymer A includes a (meth)acrylic acid ester monomer unit, an obtained electrode mixed material layer can be provided with a suitable degree of affinity with electrolyte solution, and rate characteristics and cycle characteristics of a secondary battery including the electrode mixed material layer can be improved.

The (meth)acrylic acid ester monomer may, for example, be a (meth)acrylic acid alkyl ester monomer in which the number of ethylenically unsaturated bonds is 1. Moreover, the (meth)acrylic acid alkyl ester monomer may, for example, be a (meth)acrylic acid alkyl ester monomer that includes a linear alkyl group or a (meth)acrylic acid alkyl ester monomer that includes a branched alkyl group. Examples of (meth)acrylic acid ester monomers include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, (meth)acrylic acid alkyl esters in which the alkyl group is a linear alkyl group are preferable, and butyl acrylate and methyl methacrylate are more preferable from a viewpoint of providing an obtained electrode mixed material layer with an appropriate degree of affinity with electrolyte solution. One of these (meth)acrylic acid ester monomers may be used, or two or more of these (meth)acrylic acid ester monomers may be used in combination.

The fractional content of the (meth)acrylic acid ester monomer unit in the polymer A when all repeating units included in the polymer A are taken to be 100.00 mass % is preferably not less than 30.00 mass % and not more than 98.00 mass %. When the fractional content of the (meth)acrylic acid ester monomer unit in the polymer A is within the range set forth above, an obtained electrode mixed material layer can be provided with a suitable degree of affinity with electrolyte solution, and rate characteristics of a secondary battery including the electrode mixed material layer can be improved.

[Other Monomer Units]

The polymer A may include other monomer units derived from other monomers that are copolymerizable with the various monomers described above. Examples of other monomers that can form such other monomer units include known monomers that can be used in production of a binding component in a binder composition for an electrode of a non-aqueous secondary battery. More specifically, examples of other monomers that can be used include aromatic vinyl monomers such as styrene, α-methylstyrene, butoxystyrene, and vinylnaphthalene, nitrile group-containing monomers such as acrylonitrile and methacrylonitrile, and amide group-containing monomers such as acrylamide, dimethylacrylamide, and hydroxyethyl acrylamide. One of these other monomers may be used individually, or two or more of these other monomers may be used in combination.

The fractional content of other monomer units in the polymer A when all repeating units in the polymer A are taken to be 100.00 mass % is preferably 50.00 mass % or less, more preferably 30.0 mass % or less, and may be 0.00 mass %.

[Viscosity]

The polymer A is required to have a viscosity of 10,000 mPa·s or less at a shear rate of $0.1\ s^{-1}$ when mixed with organic solvent in a concentration of 8 mass % to obtain a mixture. The organic solvent is the organic solvent that is contained in the binder composition with the polymer A. This organic solvent is described further below. As a result of the mixture of the polymer A and the organic solvent having a viscosity of 10,000 mPa·s or less at a shear rate of $0.1\ s^{-1}$, a slurry composition can be provided with a sufficiently high solid content concentration when the slurry composition is produced using the binder composition containing the polymer A. The viscosity can be controlled by, for example, adjusting the amount of a cross-linkable monomer in a monomer composition used in production of the polymer A or adjusting the dispersed particle shape of the polymer A. The "solid content concentration" of a slurry composition referred to in the present specification is the mass of components other than organic solvent that are contained in the slurry composition as a mass percentage relative to the total mass of the slurry composition. More specifically, the "solid content concentration" of a slurry composition can be calculated by a method described in the EXAMPLES section.

When the polymer A is mixed with the organic solvent in a concentration of 8 mass % to obtain a mixture, the viscosity of the mixture at a shear rate of $0.1\ s^{-1}$ is preferably 5,000 mPa·s or less, more preferably 1,000 mPa·s or less, and even more preferably 800 mPa·s or less, and is preferably 1 mPa·s or more, and more preferably 3 mPa·s or more. Battery characteristics of a secondary battery including an obtained electrode mixed material layer can be further improved when the viscosity is within any of the ranges set forth above. In particular, a slurry composition having a sufficiently high solid content concentration can be obtained using the binder composition containing the polymer A when the viscosity is not more than any of the upper limits set forth above.

Moreover, the viscosity of the polymer A at a shear rate of 10 s$^{-1}$ when the polymer A is mixed with the organic solvent in a concentration of 8 mass % to obtain a mixture is preferably 1,000 mPa·s or less, more preferably 500 mPa·s or less, even more preferably 300 mPa·s or less, and particularly preferably 100 mPa·s or less, and is preferably 1 mPa·s or more, and more preferably 3 mPa·s or more. Battery characteristics of a secondary battery including an obtained electrode mixed material layer can be further improved when the viscosity of the polymer A under these conditions is within any of the ranges set forth above. In particular, a slurry composition having a sufficiently high solid content concentration can be obtained using the binder composition containing the polymer A when the viscosity is not more than any of the upper limits set forth above.

[NMP-Insoluble Content]

Insoluble content of the polymer A when the polymer A is mixed with N-methyl-2-pyrrolidone (hereinafter, also referred to simply as "NMP") in a concentration of 8 mass % is preferably 70 mass % or more, more preferably 80 mass % or more, even more preferably 90 mass % or more, and may be 100 mass % (i.e., the polymer A may be insoluble in NMP). Battery characteristics of a secondary battery including an obtained electrode mixed material layer can be further improved when the NMP-insoluble content is not less than any of the lower limits set forth above. The NMP-insoluble content can be controlled by adjusting the amount of a cross-linkable monomer in a monomer composition used in production of the polymer A.

[Particle Diameter of Polymer A]

The volume-average particle diameter of the polymer A in organic solvent is preferably 100 nm or more, more preferably 200 nm or more, and even more preferably 300 nm or more, and is preferably 1,000 nm or less, more preferably 800 nm or less, and even more preferably 700 nm or less. Battery characteristics of a secondary battery including an obtained electrode mixed material layer can be further improved when the particle diameter of the polymer A in organic solvent is not less than any of the lower limits set forth above. Moreover, the peel strength of an obtained electrode mixed material layer can be further improved when the particle diameter of the polymer A in organic solvent is not more than any of the upper limits set forth above. The particle diameter of the polymer A can be controlled by adjusting the polymerization time and the amount of additives in production of the polymer A, for example.

[Solubility of Polymer a in Electrolyte Solution]

The polymer A preferably has low solubility in electrolyte solution (hereinafter, also referred to simply as "electrolyte solution solubility"). More specifically, soluble content of the polymer A when 3 g of the polymer A is added to 100 g of electrolyte solution (composition: LiPF$_6$ solution of 1.0 M in concentration (solvent: mixed solvent of ethylene carbonate (EC)/diethyl carbonate (DEC)=5/5 (volume ratio); additive: 2 volume % (solvent ratio) of vinylene carbonate)) is preferably less than 20 mass %, more preferably less than 15 mass %, and even more preferably less than 10 mass %. Battery characteristics of a secondary battery including an obtained electrode mixed material layer can be further improved when the electrolyte solution solubility of the polymer A is less than any of the upper limits set forth above.

The electrolyte solution solubility of the polymer A can be controlled by adjusting the amount of a cross-linkable monomer or altering the type or ratio of other monomers in a monomer composition used in production of the polymer A.

[Degree of Swelling in Electrolyte Solution of Polymer A]

The degree of swelling in electrolyte solution of the polymer A is preferably 300 mass % or less, more preferably 200 mass % or less, and even more preferably 150 mass % or less, and is preferably 100 mass % or more, more preferably 103 mass % or more, and even more preferably 105 mass % or more. Battery characteristics of a secondary battery including an obtained electrode mixed material layer can be further improved when the degree of swelling in electrolyte solution of the polymer A is within any of the ranges set forth above. The degree of swelling in electrolyte solution of a polymer A can be measured by a method described in the EXAMPLES section. Moreover, the degree of swelling in electrolyte solution of the polymer A can be controlled by adjusting the amount of a cross-linkable monomer or altering the type or ratio of other monomers in a monomer composition used in production of the polymer A.

[Glass-Transition Temperature of Polymer A]

The glass-transition temperature of the polymer A is preferably −40° C. or higher, more preferably −10° C. or higher, even more preferably 5° C. or higher, and further preferably 10° C. or higher, and is preferably 120° C. or lower, more preferably 70° C. or lower, and even more preferably 55° C. or lower. The pressability and peel strength of an obtained electrode mixed material layer can be increased and cycle characteristics of a secondary battery including the electrode mixed material layer can be further improved when the glass-transition temperature of the polymer A is not lower than any of the lower limits set forth above. Moreover, the peel strength of an obtained electrode mixed material layer can be further improved when the glass-transition temperature of the polymer A is not higher than any of the upper limits set forth above. The glass-transition temperature of a polymer A can be measured in accordance with JIS K7121. Moreover, the glass-transition temperature of the polymer A can be controlled by, for example, adjusting the type and/or amount of an acrylic acid ester monomer or adjusting the type or ratio of other monomers in a monomer composition used in production of the polymer A.

[Production Method of Polymer A]

No specific limitations are placed on the method by which the polymer A set forth above is produced. For example, the polymer A can be produced by adding a polymerization initiator such as ammonium persulfate to a monomer composition containing the monomers described above and then carrying out a polymerization reaction.

The fractional content of each monomer in the monomer composition used in production of the polymer A can be set in accordance with the fractional content of each repeating unit in the polymer A.

The polymerization method is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

<Polymer B>

The polymer B is a component that can improve thixotropy of the binder composition or a slurry composition produced using the binder composition. Moreover, the polymer B is a component that can function as a binder in conjunction with the polymer A. The polymer B may, for example, be a fluoropolymer (polymer including mainly a fluorine-containing monomer unit) such as polyvinylidene fluoride or a (meth)acrylonitrile polymer (polymer including mainly a (meth)acrylonitrile monomer unit) such as polyacrylonitrile, but is not specifically limited thereto. Examples of various monomers that can form the various monomer units include known examples of such monomers. The phrase "including mainly" used with respect to one type of monomer unit or two or more types of monomer units in the present specification means that "when the amount of all monomer units included in a polymer is taken to be 100 mass %, the fractional content of the one type of monomer unit or the total fractional content of the two or more types of monomer units is more than 50 mass %".

[Viscosity]

The viscosity of the polymer B at a shear rate of 10 s$^{-1}$ when mixed with organic solvent in a concentration of 8 mass % to obtain a mixture is preferably 10 mPa·s or more, and more preferably 100 mPa·s or more, and is preferably 10,000 mPa·s or less, and more preferably 6,000 mPa·s or less. The organic solvent is the organic solvent that is contained in the binder composition with the polymer B. This organic solvent is described further below. When viscosity of a mixture of the polymer B and the organic solvent at a shear rate of 10 s$^{-1}$ is within any of the ranges set forth above, a slurry composition produced using the binder composition containing the polymer B can be provided with a sufficiently high solid content concentration. It is presumed that the polymer B having a viscosity satisfying any of the ranges set forth above is dissolved in the organic solvent and that the polymer B partially covers the surface of solid content in a slurry composition, such as an electrode active material and a conductive additive, which enables the polymer B to display a function of protecting this solid content in electrolyte solution.

[NMP-Insoluble Content of Polymer B]

Insoluble content of the polymer B when the polymer B is mixed with N-methyl-2-pyrrolidone in a concentration of 8 mass % is preferably 50 mass % or less, more preferably 30 mass % or less, and even more preferably 10 mass % or less. Note that the insoluble content of the polymer B when the polymer B is mixed with N-methyl-2-pyrrolidone may be 0.2 mass % or less.

The solid content concentration of a slurry composition produced using the binder composition can be further increased when this NMP-insoluble content is not more than any of the upper limits set forth above. This is presumed to be due to the polymer B having an effect of inhibiting aggregation of solid content such as an electrode active material in the binder composition.

[Degree of Swelling in Electrolyte Solution of Polymer B]

The degree of swelling in electrolyte solution of the polymer B is preferably 200 mass % or less, and more preferably 150 mass % or less, and is preferably 100 mass % or more, and more preferably 110 mass % or more. Battery characteristics of a secondary battery including an obtained electrode mixed material layer can be further improved when the degree of swelling in electrolyte solution of the polymer B is within any of the ranges set forth above. The degree of swelling in electrolyte solution of a polymer B can be measured by a method described in the EXAMPLES section.

<Ratio of Amounts of Polymer a and Polymer B>

The amount of the polymer A when the total amount of the polymer A and the polymer B is taken to be 100 mass % is preferably 10 mass % or more, and more preferably 20 mass % or more, and is preferably 75 mass % or less, more preferably 70 mass % or less, and even more preferably 60 mass % or less. When the amount of the polymer A is not less than any of the lower limits set forth above, excessive increase of viscosity can be suppressed in a situation in which a slurry composition is produced. Moreover, when the amount of the polymer A is not less than any of the lower limits set forth above, the pressability of an obtained electrode mixed material layer can be increased, and, as a result, a high-density electrode mixed material layer can be formed, and rate characteristics of a secondary battery including the electrode mixed material layer can be enhanced. Furthermore, in a situation in which a slurry composition is produced, thixotropy of the slurry composition can be improved and the peel strength and flexibility of an electrode mixed material layer formed using the slurry composition can be improved when the amount of the polymer A is not more than any of the upper limits set forth above.

<Organic Solvent>

The organic solvent in the presently disclosed binder composition may, for example, be an alcohol such as methanol, ethanol, n-propanol, isopropanol, n-butanol, isobutanol, t-butanol, pentanol, hexanol, heptanol, octanol, nonanol, decanol, or amyl alcohol, a ketone such as acetone, methyl ethyl ketone, or cyclohexanone, an ester such as ethyl acetate or butyl acetate, an ether such as diethyl ether, dioxane, or tetrahydrofuran, an amide polar organic solvent such as N,N-dimethylformamide or N-methyl-2-pyrrolidone (NMP), an aromatic hydrocarbon such as toluene, xylene, chlorobenzene, orthodichlorobenzene, or paradichlorobenzene, or the like. One of these organic solvents may be used individually, or two or more of these organic solvents may be used as a mixture.

Of these examples, NMP is preferable as the organic solvent.

<Other Components>

Other than the components set forth above, the presently disclosed binder composition may contain components such as a reinforcing material, a leveling agent, a viscosity modifier, and an additive for electrolyte solution. These other components are not specifically limited so long as they do not affect the battery reactions and may be selected from commonly known components such as those described in WO 2012/115096 A1. One of these components may be used individually, or two or more of these components may be used in combination in a freely selected ratio.

<Production of Binder Composition>

The presently disclosed binder composition can be produced by mixing the previously described polymer A, organic solvent, optional polymer B, and other components by a known method. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

In a case in which the polymer A is polymerized in an organic solvent, a dispersion liquid of the polymer A dispersed in the organic solvent can be mixed in that form in production of the binder composition.

Production of the binder composition and production of the subsequently described slurry composition may be implemented at the same time by, for example, adding an electrode active material and other optional components after the polymer A and the organic solvent have been mixed.

The solid content concentration of the binder composition is preferably not less than 5 mass % and not more than 60 mass %.

(Slurry Composition for Non-Aqueous Secondary Battery Electrode)

The presently disclosed slurry composition for a non-aqueous secondary battery electrode contains an electrode active material and the binder composition set forth above, and optionally further contains other components. In other words, the presently disclosed slurry composition contains an electrode active material, the previously described polymer A, and an organic solvent, and optionally further contains other components. The solid content concentration of the presently disclosed slurry composition can be increased as a result of the presently disclosed slurry composition containing the binder composition set forth above. Consequently, an electrode including an electrode mixed material layer that is formed using the presently disclosed slurry composition has high peel strength and high density. Therefore, the presently disclosed slurry composition makes it possible to cause a secondary battery to display excellent battery characteristics.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specifically, the positive electrode active material for a lithium ion secondary battery may be, without any specific limitations, a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn (Li(Co Mn Ni)$O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$.

The amount and particle diameter of the positive electrode active material are not specifically limited and may be the same as those of conventionally-used positive electrode active materials.

<Conductive Material>

A conductive material is a material that ensures electrical contact among the electrode active material. Examples of conductive materials that can be used include conductive carbon materials such as carbon black (for example, acetylene black, Ketjenblack® (Ketjenblack is a registered trademark in Japan, other countries, or both), and furnace black), single-walled and multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single-layer and multi-layer graphene, and carbon non-woven fabric sheet obtained through pyrolysis of non-woven fabric made from polymer fiber; and fibers and foils of various metals.

One of these conductive materials may be used individually, or two or more of these conductive materials may be used in combination. The amount and particle diameter of the conductive material are not specifically limited and may be the same as those of conventionally-used conductive materials.

<Binder Composition>

The binder composition for a non-aqueous secondary battery electrode containing the polymer A set forth above is used as a binder composition.

<Fractional Content of Polymer a and Polymer B>

—Solid Content Concentration—

The fractional content of the binder (polymer A and polymer B) in the slurry composition for a secondary battery electrode is, for example, preferably not less than 0.3 mass % and not more than 5 mass % in terms of solid content. When the fractional content of the binder in the slurry composition is not less than the lower limit set forth above, the peel strength of an obtained electrode mixed material layer can be further improved. Moreover, when the fractional content of the binder in the slurry composition is not more than the upper limit set forth above, excessive increase of viscosity of the slurry composition can be inhibited, and coatability of the slurry composition can be ensured while also improving the solid content concentration of the slurry composition.

—Fractional Content Among Solid Components—

The fractional content of the binder (polymer A and polymer B) in the slurry composition for a secondary battery electrode when the total amount of the polymer A, the polymer B, the electrode active material, and the conductive material (in a case in which a conductive material is used) is taken to be 100 mass % is preferably 0.3 mass % or more, and is preferably 3 mass % or less, and more preferably 2.4 mass % or less.

<Other Components>

Examples of other components that may be contained in the slurry composition include, but are not specifically limited to, the same other components as may be contained in the presently disclosed binder composition. One of such other components may be used individually, or two or more of such other components may be used in combination in a freely selected ratio.

<Production of Slurry Composition>

The slurry composition set forth above can be produced by dissolving or dispersing the above-described components in an organic solvent. Specifically, the slurry composition can be produced by mixing the above-described components and the organic solvent using a mixer such as a ball mill, a sand mill, a bead mill, a pigment disperser, a grinding machine, an ultrasonic disperser, a homogenizer, a planetary mixer, or a FILMIX. Examples of organic solvents that can be used in production of the slurry composition include the same organic solvents as can be used in the presently disclosed binder composition. Moreover, the organic solvent contained in the binder composition may be used as the organic solvent that is used in production of the slurry composition.

(Electrode for Non-Aqueous Secondary Battery)

The presently disclosed electrode for a non-aqueous secondary battery includes a current collector and an electrode mixed material layer formed on the current collector, wherein the electrode mixed material layer is formed using the slurry composition set forth above. In other words, the electrode mixed material layer contains at least an electrode active material and the polymer A, and optionally contains the polymer B and other components. It should be noted that components contained in the electrode mixed material layer are components that were contained in the previously described slurry composition. Furthermore, the preferred ratio of these components in the electrode mixed material layer is the same as the preferred ratio of these components in the slurry composition.

Good formation of an electrode mixed material layer having high peel strength and density on a current collector is possible in the presently disclosed electrode for a non-aqueous secondary battery as a result of a slurry composition that contains the presently disclosed binder composition being used. Consequently, a secondary battery having excellent battery characteristics such as rate characteristics and cycle characteristics can be obtained using this electrode.

<Production Method of Electrode>

The presently disclosed electrode for a non-aqueous secondary battery can be produced, for example, through a step of applying the above-described slurry composition onto the current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode for a secondary battery that includes the current collector and the electrode mixed material layer.

After the drying step, the electrode mixed material layer may be further subjected to a pressing process such as mold pressing or roll pressing. The pressing process can improve close adherence between the electrode mixed material layer and the current collector. Furthermore, in a case in which the electrode mixed material layer contains a curable polymer, the polymer is preferably cured after the electrode mixed material layer has been formed.

As a result of the presently disclosed slurry composition having a sufficiently high solid content concentration, the electrode mixed material layer formed using the slurry composition has sufficiently high density and the internal structure thereof is not easily destroyed even when the electrode mixed material layer undergoes a pressing process. Accordingly, the battery characteristics of a secondary battery can be sufficiently improved through use of the presently disclosed slurry composition for a secondary battery electrode even in a case in which a pressing process or the like is performed in electrode production.

(Non-Aqueous Secondary Battery)

The presently disclosed non-aqueous secondary battery includes a positive electrode, a negative electrode, an electrolyte solution, and a separator, wherein the presently disclosed electrode for a non-aqueous secondary battery is used as at least one of the positive electrode and the negative electrode. The presently disclosed non-aqueous secondary battery has excellent battery characteristics such as rate characteristics and cycle characteristics as a result of including the presently disclosed electrode for a non-aqueous secondary battery.

It is preferable that the presently disclosed electrode for a non-aqueous secondary battery is used as the positive electrode in the presently disclosed non-aqueous secondary battery. Although the following describes, as one example, a case in which the secondary battery is a lithium ion secondary battery, the presently disclosed secondary battery is not limited to the following example.

<Electrodes>

Known electrodes that are used in production of non-aqueous secondary batteries can be used without any specific limitations in the presently disclosed non-aqueous secondary battery as an electrode other than the electrode for a non-aqueous secondary battery set forth above. Specifically, an electrode obtained by forming an electrode mixed material layer on a current collector by a known production method may be used as an electrode other than the electrode for a non-aqueous secondary battery set forth above.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable, and $LiPF_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Suitable examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, and a mixture of ethylene carbonate and diethyl carbonate is more preferable.

The concentration of the electrolyte in the electrolyte solution may be adjusted as appropriate. Known additives such as vinylene carbonate can be added to the electrolyte solution.

<Separator>

Examples of separators that can be used include, but are not specifically limited to, those described in JP 2012-204303 A. Of these separator substrates, a microporous membrane made of polyolefinic (polyethylene, polypropylene, polybutene, or polyvinyl chloride) resin is preferred because such a membrane can reduce the total thickness of the separator, which increases the ratio of electrode active material in a secondary battery, and consequently increases the capacity per volume.

<Production Method of Non-Aqueous Secondary Battery>

The presently disclosed non-aqueous secondary battery may be produced, for example, by stacking the positive electrode and the negative electrode with the separator in-between, performing rolling, folding, or the like of the resultant laminate as necessary in accordance with the battery shape, placing the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit formed through polymerization of a given monomer is normally, unless otherwise specified, the same as the ratio (charging ratio) of the given monomer among all monomers used in polymerization of the polymer.

In the examples and comparative examples, viscosities, NMP insoluble contents, and degrees of swelling in electrolyte solution related to polymers A and B were measured as described below. Moreover, the following methods were used to measure or evaluate the volume-average particle diameter, electrolyte solution solubility, and glass-transition temperature of a polymer A, the solid content concentration of a slurry composition, the pressability, peel strength, and flexibility of an electrode mixed material layer, and the rate characteristics and cycle characteristics of a non-aqueous secondary battery.

<Viscosities Related to Polymers A and B>

For each polymer A or B produced or prepared in the examples and comparative examples, the polymer was mixed with N-methyl-2-pyrrolidone (NMP) as an organic solvent in a concentration of 8 mass % to obtain a measurement sample. The viscosity of the measurement sample was measured at a temperature of 25° C. using a rotary rheometer (MCR30 produced by Anton Paar GmbH) for shear rates of 0.1 s$^{-1}$ and 10 s$^{-1}$ in the case of a measurement sample of a polymer A and for a shear rate of 10 s$^{-1}$ in the case of a measurement sample of a polymer B.

<NMP-Insoluble Content of Polymers A and B>

For each polymer A or B produced or prepared in the examples and comparative examples, 8 g of the polymer was added to and dissolved in 92 g of NMP in an environment having a temperature of 25° C., insoluble content was filtered off by an 80-mesh screen, the filtration residue was weighed, and the ratio (mass %) of insoluble content was calculated.

<Degree of Swelling in Electrolyte Solution of Polymers A and B>

An NMP solution or NMP dispersion containing a polymer A or B produced or prepared in each example or comparative example was subjected to 7 days of preliminary drying in an environment having a humidity of 50% and a temperature of 23° C. to 25° C. to perform preliminary film formation with a thickness of 2±0.5 mm. The film obtained through preliminary film formation was dried in a 120° C. vacuum dryer for 10 hours, was cut, and approximately 1 g thereof was precisely weighed. The mass of the obtained film piece was taken to be W0. The film piece was immersed in electrolyte solution (composition: LiPF$_6$ solution of 1.0 M in concentration (solvent: mixed solvent of ethylene carbonate (EC)/diethyl carbonate (DEC)=5/5 (volume ratio); additive: 2 volume % (solvent ratio) of vinylene carbonate)) for 3 days in an environment having a temperature of 60° C. and was allowed to swell. Thereafter, the film piece was pulled out of the electrolyte solution and the mass thereof was measured after electrolyte solution on the surface had been gently wiped off. The mass of the swollen film piece was taken to be W1.

The degree of swelling in electrolyte solution was calculated using the following calculation formula.

Degree of swelling in electrolyte solution (mass %)={(W1−W0)/W0}×100

<Volume-Average Particle Diameter of Polymer A>

The volume-average particle diameter D50 of a polymer A was taken to be a particle diameter at which, in a particle diameter distribution measured with respect to an NMP dispersion adjusted to a solid content concentration of 8 mass % using a laser diffraction particle diameter distribution analyzer (SALD-3100 produced by Shimadzu Corporation), cumulative volume calculated from the small diameter end of the distribution reached 50%.

<Electrolyte Solution Solubility of Polymer A>

The solubility of a polymer A in electrolyte solution was determined by weighing insoluble content when 3 g of a polymer A produced or prepared in each example or comparative example was added to and dissolved in 100 g of electrolyte solution (composition: LiPF$_6$ solution of 1.0 M in concentration (solvent: mixed solvent of ethylene carbonate (EC)/diethyl carbonate (DEC)=5/5 (volume ratio); additive: 2 volume % (solvent ratio) of vinylene carbonate)), and then calculating a ratio (mass %) of the insoluble content relative to the total additive amount.

<Glass-Transition Temperature of Polymer A>

A dispersion liquid containing a polymer A was subjected to 7 days of preliminary drying in an environment having a humidity of 50% and a temperature of 23° C. to 26° C. to perform preliminary film formation with a thickness of 2±0.5 mm. The film obtained through preliminary film formation was dried in a 120° C. vacuum dryer for 10 hours. Thereafter, the dried film was used as a sample to measure the glass-transition temperature (° C.) in accordance with JIS K7121 under conditions of a measurement temperature of −100° C. to 180° C. and a heating rate of 5° C./min using a differential scanning calorimeter (DSC6220 produced by SII NanoTechnology Inc.).

<Solid Content Concentration of Slurry Composition>

First, 97 parts of an active material based on a lithium complex oxide of Co—Ni—Mn (NMC532; $LiNi_{5/10}Co_{2/10}Mn_{3/10}O_2$) as a positive electrode active material, 1 part of acetylene black (produced by Denki Kagaku Kogyo Kabushiki Kaisha; product name: HS-100) as a conductive material, 1 part of polyvinylidene fluoride (produced by Kureha Corporation; product name: KF-1100) prepared as a polymer B in each example, and 1 part in terms of solid content of a polymer A produced in each example were added into and mixed in a planetary mixer, and then N-methyl-2-pyrrolidone (NMP) as an organic solvent was gradually added, and mixing by stirring was performed at a temperature of 25±3° C. and a rotation speed of 25 rpm. NMP was added until the viscosity measured by a B-type viscometer at 60 rpm (M4 rotor) and 25±3° C. was within a range of 3,500 mPa·s to 4,000 mPa·s. The solid content concentration of the slurry composition at this time was calculated and evaluated as shown below.

Slurry solid content concentration=(Parts by mass of all solid content/(Parts by mass of all solid content+Additive amount of NMP (parts by mass)))×100(%)

A: Slurry solid content concentration of 75% or more
B: Slurry solid content concentration of not less than 73% and less than 75%
C: Slurry solid content concentration of not less than 70% and less than 73%
D: Slurry solid content concentration of less than 70%

<Pressability of Positive Electrode Mixed Material Layer>

A slurry composition for a positive electrode obtained in each example or comparative example was applied onto aluminum foil (current collector) of 20 μm in thickness using a comma coater such as to have a coating weight of 18.9 mg/cm² to 20.1 mg/cm². Thereafter, the aluminum foil with the slurry composition for a positive electrode applied thereon was conveyed inside a 90° C. oven for 2 minutes at a speed of 200 mm/min to dry the slurry composition. Heat treatment was subsequently performed for 2 minutes at a temperature of 120° C. to obtain a positive electrode web.

The positive electrode web obtained as described above was punched out as a disk of 1.13 cm in diameter and was compressed at a temperature of 25° C. and a pressure of 254 MPa for 10 seconds using a flat plate press. Pressability was evaluated by the following standard. A larger value for density indicates that the positive electrode mixed material layer has better pressability.

A: Density of 3.30 g/cm³ or more
B: Density of not less than 3.20 g/cm³ and less than 3.30 g/cm³
C: Density of not less than 3.10 g/cm³ and less than 3.20 g/cm³
D: Density of less than 3.10 g/cm³

<Peel Strength of Electrode Mixed Material Layer>

A rectangle of 100 mm in length and 10 mm in width was cut out from a positive electrode for a lithium ion secondary battery produced in each example or comparative example to obtain a test specimen. The test specimen was placed with the surface at which the positive electrode mixed material layer was located facing downward, and cellophane tape (tape prescribed by JIS Z1522) was affixed to the surface of the positive electrode mixed material layer. The stress during peeling of the current collector by pulling one end of the current collector in a vertical direction at a pulling speed of 100 mm/min was measured (note that the cellophane tape was secured to a test stage). This measurement was performed three times to obtain an average value. The average value was taken to be the peel strength and was evaluated by the following standard. A larger value for the peel strength indicates better close adherence between the positive electrode mixed material layer and the current collector.

A: Peel strength of 30 N/m or more
B: Peel strength of not less than 25 N/m and less than 30 N/m
C: Peel strength of not less than 20 N/m and less than 25 N/m
D: Peel strength of less than 20 N/m <Flexibility of Electrode Mixed Material Layer>

SUS cylindrical rods of different diameters were each set at the positive electrode mixed material layer-side of a positive electrode produced in each example or comparative example, and then the positive electrode was wound around the cylindrical rod. The presence or absence of cracking of the positive electrode mixed material layer was evaluated by eye. A smaller diameter indicates that the electrode mixed material layer has better flexibility.

A: No cracking at diameter of 2.0 mm
B: No cracking at diameter of 2.5 mm
C: No cracking at diameter of 3.0 mm
D: No cracking at diameter of 3.5 mm <Rate Characteristics of Secondary Battery>

A lithium ion secondary battery produced in each example or comparative example was left at rest for 5 hours at a temperature of 25° C. after injection of electrolyte solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged with a 0.2 C constant current (upper limit cell voltage: 4.20 V) and was CC discharged to a cell voltage of 3.00 V with a 0.2 C constant current. This charging and discharging at 0.2 C was repeated three times.

Next, the lithium ion secondary battery was 0.2 C constant-current charged and discharged between cell voltages of 4.20 V and 3.00 V in an environment having a temperature of 25° C., and the discharge capacity at this time was defined as C0. Thereafter, the lithium ion secondary battery was CC-CV charged with a 0.2 C constant current in the same manner and was then discharged to 3.0 V with a 2.0 C constant current in an environment having a temperature of 25° C. The discharge capacity at this time was defined as C1. A capacity maintenance rate indicated by $\Delta C=(C1/C0)\times 100$ (%) was determined as a rate characteristic and was evaluated by the following standard. A larger value for the capacity maintenance rate $\Delta C$ indicates higher discharge capacity and lower internal resistance.

A: Capacity maintenance rate $\Delta C$ of 75% or more
B: Capacity maintenance rate $\Delta C$ of not less than 73% and less than 75%
C: Capacity maintenance rate $\Delta C$ of not less than 70% and less than 73%
D: Capacity maintenance rate $\Delta C$ of less than 70%

<Cycle Characteristics of Secondary Battery>

A lithium ion secondary battery produced in each example or comparative example was left at rest for 5 hours at a temperature of 25° C. after injection of electrolyte solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, the lithium ion secondary battery was CC-CV charged by a 0.2 C constant-current method (upper limit cell voltage: 4.20 V) and was CC discharged to 3.00 V by a 0.2 C constant-current method. This charging and discharging at 0.2 C was repeated three times.

The lithium ion secondary battery was subsequently subjected to 100 cycles of charging and discharging between cell voltages of 4.20 V and 3.00 V at a charge/discharge rate of 1.0 C in an environment having a temperature of 25° C. During this cycling, the discharge capacity of the $1^{st}$ cycle was defined as X1 and the discharge capacity of the $100^{th}$ cycle was defined as X2. A capacity maintenance rate indicated by $\Delta C'=(X2/X1)\times 100(\%)$ was calculated using the discharge capacity X1 and the discharge capacity X2 and was evaluated by the following standard. A larger value for the capacity maintenance rate $\Delta C'$ indicates better cycle characteristics.

A: $\Delta C'$ of 93% or more
B: $\Delta C'$ of not less than 90% and less than 93%
C: $\Delta C'$ of not less than 87% and less than 90%
D: $\Delta C'$ of less than 87%

Example 1

<Production of Polymer A>

A septum-equipped 1 L flask that included an agitator was charged with 100 parts of deionized water, the gas phase therein was purged with nitrogen gas, and the flask was heated to 80° C., after which, 0.3 parts of ammonium persulfate (APS) as a polymerization initiator dissolved in 5.7 parts of deionized water was added into the flask.

Meanwhile, a monomer composition was obtained in a separate vessel by mixing 40 parts of deionized water, 0.18 parts of sodium polyoxyethylene alkyl ether sulfate (LATEMUL E-118B produced by Kao Corporation) as an emulsifier, 40.50 parts of n-butyl acrylate (BA) and 55.10 parts of methyl methacrylate (MMA) as (meth)acrylic acid ester monomers, 4.00 parts of methacrylic acid (MAA) as an ethylenically unsaturated acid monomer, and 0.40 parts of allyl methacrylate (AMA) as a cross-linkable monomer. The monomer composition was continuously added to the septum-equipped 1 L flask over 1 hour to carry out polymerization. The reaction was carried out at 80° C. during this addition. Once the addition was completed, further stirring at 80° C. was performed for 1 hour to complete the reaction and yield a water dispersion containing a polymer A. Next, an appropriate amount of NMP was added to the obtained water dispersion of the polymer A to obtain a mixture. The mixture was subsequently subjected to vacuum distillation at 90° C. to remove water and excess NMP, and thereby obtain an NMP solution (solid content concentration: 8%) of the polymer A. Various attributes of the polymer A were measured by the previously described methods. The results are shown in Table 1.

<Production of Polymer B>

A reactor A to which a mechanical stirrer and a condenser were attached was charged with 85 parts of deionized water and 0.2 parts of sodium dodecylbenzenesulfonate in a nitrogen atmosphere. These materials were subsequently heated to 55° C. under stirring, and 0.3 parts of potassium persulfate was added into the reactor A in the form of a 5.0% aqueous solution. Next, in a nitrogen atmosphere, 94.0 parts of acrylonitrile as a nitrile group-containing monomer, 1.0 parts of acrylamide as a basic group-containing monomer, 2.0 parts of acrylic acid as an acidic group-containing monomer, 3.0 parts of n-butyl acrylate as a (meth)acrylic acid ester monomer, 0.6 parts of sodium dodecylbenzenesulfonate, 0.035 parts of tert-dodecyl mercaptan, 0.4 parts of polyoxyethylene lauryl ether, and 80 parts of deionized water were added into a separate vessel B to which a mechanical stirrer was attached and were stirred and emulsified to produce a monomer mixture. This monomer mixture was added into the reactor A at a constant rate over 5 hours while in a stirred and emulsified state, and was allowed to react until the polymerization conversion rate reached 95% to yield a water dispersion of a polyacrylonitrile (PAN) copolymer including mainly acrylonitrile units (94 mass %). Next, an appropriate amount of NMP was added to the obtained water dispersion of the PAN copolymer to obtain a mixture. The mixture was subsequently subjected to vacuum distillation at 90° C. to remove water and excess NMP, and thereby obtain an NMP solution (solid content concentration: 8%) of the PAN copolymer. The viscosity of the NMP solution at 10 s$^{-1}$ was 5,750 mPa·s.

<Production of Slurry Composition for Secondary Battery Positive Electrode>

First, 97 parts of an active material based on a lithium complex oxide of Co—Ni—Mn (NMC532; LiNi$_{5/10}$Co$_{2/10}$Mn$_{3/10}$O$_2$) as a positive electrode active material, 1 part of acetylene black (produced by Denki Kagaku Kogyo Kabushiki Kaisha; product name: HS-100) as a conductive material, 1 part in terms of solid content of the polymer A obtained as described above, and 1 part of the polymer B were added into and mixed in a planetary mixer, and then N-methyl-2-pyrrolidone (NMP) as an organic solvent was gradually added, and mixing by stirring was performed at a temperature of 25±3° C. and a rotation speed of 25 rpm to adjust the viscosity as measured by a B-type viscometer at 60 rpm (M4 rotor) and 25±3° C. to 3,600 mPa·s.

<Production of Positive Electrode>

The slurry composition for a positive electrode obtained as described above was applied onto aluminum foil (current collector) of 20 µm in thickness by a comma coater such as to have a coating weight of 20±0.5 mg/cm$^2$.

The aluminum foil was conveyed inside a 90° C. oven for 2 minutes and inside a 120° C. oven for 2 minutes at a speed of 200 mm/min so as to dry the slurry composition on the aluminum foil and obtain a positive electrode web including a positive electrode mixed material layer formed on the current collector.

The positive electrode mixed material layer-side of the produced positive electrode web was subsequently roll pressed with a line pressure of 14 t (tons) in an environment having a temperature of 25±3° C. to obtain a positive electrode having a positive electrode mixed material layer density of 3.20 g/cm$^3$. The obtained positive electrode was evaluated by the previously described methods. The results are shown in Table 1.

<Production of Binder Composition for Negative Electrode>

A 5 MPa pressure vessel equipped with an agitator was charged with 65 parts of styrene, 35 parts of 1,3-butadiene, 2 parts of itaconic acid, 1 part of 2-hydroxyethyl acrylate, 0.3 parts of t-dodecyl mercaptan as a molecular weight modifier, 5 parts of sodium dodecylbenzenesulfonate as an emulsifier, 150 parts of deionized water, and 1 part of potassium persulfate as a polymerization initiator. These materials were sufficiently stirred and were then heated to a temperature of 55° C. to initiate polymerization. Cooling was performed to terminate the reaction once monomer consumption had reached 95.0%. A water dispersion containing a polymer that was obtained in this manner was adjusted to pH 8 through addition of 5% sodium hydroxide aqueous solution. Thereafter, unreacted monomer was removed by thermal-vacuum distillation. Cooling was then performed to a temperature of 30° C. or lower to obtain a water dispersion containing a binder for a negative electrode.

<Production of Slurry Composition for Negative Electrode>

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the binder composition for a negative electrode obtained as described above was loaded into the planetary mixer, and kneading at a rotation speed of 40 rpm was performed for 40 minutes. Deionized water was added to adjust the viscosity to 3,000±500 mPa·s (measured by B-type viscometer at 25° C. and 60 rpm) and thereby produce a slurry composition for a negative electrode.

<Production of Negative Electrode>

The slurry composition for a negative electrode was applied onto the surface of copper foil (current collector) of 15 μm in thickness by a comma coater such as to have a coating weight of 11±0.5 mg/cm². The copper foil with the slurry composition for a negative electrode applied thereon was subsequently conveyed inside an 80° C. oven for 2 minutes and inside a 110° C. oven for 2 minutes at a speed of 400 mm/min so as to dry the slurry composition on the copper foil and obtain a negative electrode web including a negative electrode mixed material layer formed on the current collector.

The negative electrode mixed material layer-side of the produced negative electrode web was subsequently roll pressed with a line pressure of 11 t (tons) in an environment having a temperature of 25±3° C. to obtain a negative electrode having a negative electrode mixed material layer density of 1.60 g/cm³.

<Preparation of Separator for Secondary Battery>

A separator made from a single layer of polypropylene (#2500 produced by Celgard, LLC.) was used.

<Production of Non-Aqueous Secondary Battery>

The negative electrode, positive electrode, and separator described above were used to produce a single-layer laminate cell (initial design discharge capacity: equivalent to 30 mAh), and this cell was positioned in aluminum packing. Thereafter, the aluminum packing was filled with $LiPF_6$ solution of 1.0 M in concentration (solvent: ethylene carbonate (EC)/diethyl carbonate (DEC)=5/5 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. The lithium ion secondary battery was used to evaluate rate characteristics and cycle characteristics as previously described. The results are shown in Table 1.

Examples 2 to 12

Various operations, measurements, and evaluations were performed in the same manner as in Example 1 with the exception that the make-up of the monomer composition in production of the polymer A was changed as shown in Table 1. The results are shown in Table 1.

Examples 13 to 15

Various operations, measurements, and evaluations were performed in the same manner as in Example 1 with the exception that the amounts of the polymer A and the polymer B were changed as shown in Table 1. The results are shown in Table 1.

Comparative Examples 1 to 5

Various operations, measurements, and evaluations were performed in the same manner as in Example 1 with the exception that a polymer produced by changing the make-up of the monomer composition as shown in Table 1 was used instead of the polymer A of Example 1. The results are shown in Table 2.

Comparative Example 6

A polymer A was not used and polyvinylidene fluoride (produced by Kureha Corporation; product name: KF-1100) was used as a polymer B. The viscosity at a shear rate of 10 $s^{-1}$ measured with respect to this polymer B by the previously described method was 4,830 mPa·s. With the exception of these points, various operations, measurements, and evaluations were performed in the same manner as in Example 1. The results are shown in Table 2.

In Table 1, shown below:
"BA" indicates n-butyl acrylate;
"MMA" indicates methyl methacrylate;
"MAA" indicates methacrylic acid;
"AMA" indicates allyl methacrylate;
"PAN" indicates polyacrylonitrile;
"PVdF" indicates polyvinylidene fluoride;
"AB" indicates acetylene black;
"EDMA" indicates ethylene glycol dimethacrylate;
"A-TMPT" indicates trimethylolpropane triacrylate;
"ATM-35E" indicates ethoxylated pentaerythritol tetraacrylate;
"St" indicates styrene;
"AN" indicates acrylonitrile;
"2-EHA" indicates 2-ethylhexyl acrylate; and
"CHMA" indicates cyclohexyl methacrylate.

TABLE 1

| | | | | Example 1 | Example 2 | Example 3 | Example 4 | Example 5 |
|---|---|---|---|---|---|---|---|---|
| Slurry composition | Polymer A | Ethylenically unsaturated acid monomer | Type | MAA | MAA | MAA | MAA | MAA |
| | | | Amount (parts) | 4.00 | 4.00 | 4.00 | 4.00 | 4.00 |
| | | Cross-linkable monomer | Type | AMA | AMA | EDMA | EDMA | A-TMPT |
| | | | Amount (parts) | 0.40 | 0.80 | 0.40 | 0.40 | 0.40 |
| | | (Meth)acrylic acid ester | BA (parts by mass) | 40.50 | 40.50 | 55.50 | 40.50 | 40.50 |

TABLE 1-continued

|  |  |  |  |  |  |  |  |  |
|---|---|---|---|---|---|---|---|---|
|  |  | monomer | MMA (parts by mass) | 55.10 | 54.70 | 40.10 | 55.10 | 55.10 |
|  |  |  | 2-EHA (parts by mass) | — | — | — | — | — |
|  |  |  | CHMA (parts by mass) | — | — | — | — | — |
|  |  | Nitrile group-containing monomer | AN (parts by mass) | — | — | — | — | — |
|  |  | Aromatic vinyl monomer | St (parts by mass) | — | — | — | — | — |
|  |  | Viscosity (mPa · s) | At shear rate of 0.1 (1/s) | 140 | 150 | 150 | 150 | 150 |
|  |  |  | At shear rate of 10 (1/s) | 40 | 40 | 40 | 40 | 40 |
|  |  | NMP-insoluble content (mass %) |  | 97 | 98 | 97 | 97 | 99 |
|  |  | Volume-average particle diameter (nm) |  | 510 | 510 | 510 | 510 | 510 |
|  |  | Electrolyte solution-insoluble content (mass %) |  | <1 | <1 | <1 | <1 | <1 |
|  |  | Degree of swelling in electrolyte solution (mass %) |  | 150 | 130 | 140 | 150 | 140 |
|  |  | Glass-transition temperature (° C.) |  | 26 | 25 | 5 | 22 | 30 |
|  |  | Amount (parts by mass) |  | 1 | 1 | 1 | 1 | 1 |
|  | Polymer B | Type |  | PAN | PAN | PAN | PAN | PAN |
|  |  | Viscosity (mPa · s; at shear rate of 10 (1/s)) |  | 5750 | 5750 | 5750 | 5750 | 5750 |
|  |  | NMP-insoluble content (mass %) |  | 0.2 | 0.2 | 0.2 | 0.2 | 0.2 |
|  |  | Degree of swelling in electrolyte solution (mass %) |  | 120 | 120 | 120 | 120 | 120 |
|  |  | Amount (parts by mass) |  | 1 | 1 | 1 | 1 | 1 |
|  | Active material | Type |  | NMC | NMC | NMC | NMC | NMC |
|  |  | Amount (parts) |  | 97 | 97 | 97 | 97 | 97 |
|  | Conductive additive | Type |  | AB | AB | AB | AB | AB |
|  |  | Amount (parts) |  | 1 | 1 | 1 | 1 | 1 |
| Evaluation | Slurry composition solid content concentration |  |  | A | A | A | A | A |
|  | Electrode mixed material layer pressability |  |  | B | B | B | A | B |
|  | Electrode mixed material layer peel strength |  |  | A | A | B | A | A |
|  | Electrode mixed material layer flexibility |  |  | A | A | A | A | A |
|  | Secondary battery rate characteristics |  |  | B | A | B | B | B |
|  | Secondary battery cycle characteristics |  |  | A | A | A | A | A |

|  |  |  |  | Example 6 | Example 7 | Example 8 | Example 9 | Example 10 |
|---|---|---|---|---|---|---|---|---|
| Slurry composition | Polymer A | Ethylenically unsaturated acid monomer | Type | MAA | MAA | MAA | MAA | MAA |
|  |  |  | Amount (parts) | 4.00 | 4.00 | 2.00 | 8.00 | 4.00 |
|  |  | Cross-linkable monomer | Type | ATM-35E | AMA | EDMA | EDMA | AMA |
|  |  |  | Amount (parts) | 0.40 | 0.40 | 0.40 | 0.40 | 4.00 |
|  |  | (Meth)acrylic acid ester monomer | BA (parts by mass) | 40.50 | 20.50 | 55.50 | 40.50 | 40.50 |
|  |  |  | MMA (parts by mass) | 55.10 | 55.10 | 42.10 | 51.10 | 51.50 |
|  |  |  | 2-EHA (parts by mass) | — | — | — | — | — |
|  |  |  | CHMA (parts by mass) | — | — | — | — | — |
|  |  | Nitrile group-containing monomer | AN (parts by mass) | — | — | — | — | — |
|  |  | Aromatic vinyl monomer | St (parts by mass) | — | 20.00 | — | — | — |
|  |  | Viscosity (mPa · s) | At shear rate of 0.1 (1/s) | 150 | 250 | 150 | 150 | 260 |
|  |  |  | At shear rate of 10 (1/s) | 40 | 40 | 45 | 40 | 80 |
|  |  | NMP-insoluble content (mass %) |  | 99 | 95 | 97 | 97 | 99 |
|  |  | Volume-average particle diameter (nm) |  | 510 | 380 | 500 | 480 | 510 |
|  |  | Electrolyte solution-insoluble content (mass %) |  | <1 | <1 | <1 | <1 | <1 |
|  |  | Degree of swelling in electrolyte solution (mass %) |  | 140 | 140 | 140 | 140 | 130 |
|  |  | Glass-transition temperature (° C.) |  | 25 | 60 | 20 | 28 | 26 |
|  |  | Amount (parts by mass) |  | 1 | 1 | 1 | 1 | 1 |
|  | Polymer B | Type |  | PAN | PAN | PAN | PAN | PAN |
|  |  | Viscosity (mPa · s; at shear rate of 10 (1/s)) |  | 5750 | 5750 | 5750 | 5750 | 5750 |

TABLE 1-continued

|  |  |  |  | | | | | |
|---|---|---|---|---|---|---|---|---|
|  |  |  | NMP-insoluble content (mass %) | 0.2 | 0.2 | 0.2 | 0.2 | 0.2 |
|  |  |  | Degree of swelling in electrolyte solution (mass %) | 120 | 120 | 120 | 120 | 120 |
|  |  |  | Amount (parts by mass) | 1 | 1 | 1 | 1 | 1 |
|  | Active material | Type |  | NMC | NMC | NMC | NMC | NMC |
|  |  | Amount (parts) |  | 97 | 97 | 97 | 97 | 97 |
|  | Conductive additive | Type |  | AB | AB | AB | AB | AB |
|  |  | Amount (parts) |  | 1 | 1 | 1 | 1 | 1 |
| Evaluation | Slurry composition solid content concentration |  |  | A | A | A | A | B |
|  | Electrode mixed material layer pressability |  |  | A | B | B | B | B |
|  | Electrode mixed material layer peel strength |  |  | A | C | B | B | B |
|  | Electrode mixed material layer flexibility |  |  | A | C | A | B | B |
|  | Secondary battery rate characteristics |  |  | B | C | B | B | B |
|  | Secondary battery cycle characteristics |  |  | A | B | A | A | B |

|  |  |  |  | Example 11 | Example 12 | Example 13 | Example 14 | Example 15 |
|---|---|---|---|---|---|---|---|---|
| Slurry composition | Polymer A | Ethylenically unsaturated acid monomer | Type | MAA | MAA | MAA | MAA | MAA |
|  |  |  | Amount (parts) | 4.00 | 8.00 | 4.00 | 4.00 | 4.00 |
|  |  | Cross-linkable monomer | Type | — | AMA | AMA | AMA | AMA |
|  |  |  | Amount (parts) | 0.02 | 4.00 | 0.40 | 0.40 | 0.40 |
|  |  | (Meth)acrylic acid ester monomer | BA (parts by mass) | 40.50 | 20.50 | 40.50 | 40.50 | 40.50 |
|  |  |  | MMA (parts by mass) | 55.50 | 37.50 | 55.10 | 55.10 | 55.10 |
|  |  |  | 2-EHA (parts by mass) | — | — | — | — | — |
|  |  |  | CHMA (parts by mass) | — | — | — | — | — |
|  |  | Nitrile group-containing monomer | AN (parts by mass) | — | 10 | — | — | — |
|  |  | Aromatic vinyl monomer | St (parts by mass) | — | 20 | — | — | — |
|  |  | Viscosity (mPa · s) | At shear rate of 0.1 (1/s) | 260 | 320 | 140 | 140 | 140 |
|  |  |  | At shear rate of 10 (1/s) | 80 | 110 | 40 | 40 | 40 |
|  |  | NMP-insoluble content (mass %) |  | 90 | 90 | 97 | 97 | 97 |
|  |  | Volume-average particle diameter (nm) |  | 510 | 510 | 510 | 510 | 510 |
|  |  | Electrolyte solution-insoluble content (mass %) |  | <1 | 3 | <1 | <1 | <1 |
|  |  | Degree of swelling in electrolyte solution (mass %) |  | 300 | 280 | 150 | 150 | 150 |
|  |  | Glass-transition temperature (° C.) |  | 23 | 65 | 26 | 26 | 26 |
|  |  | Amount (parts by mass) |  | 1 | 1 | 0.5 | 0.25 | 1.5 |
|  | Polymer B | Type |  | PAN | PAN | PAN | PAN | PAN |
|  |  | Viscosity (mPa · s; at shear rate of 10 (1/s)) |  | 5750 | 5750 | 5750 | 5750 | 5750 |
|  |  | NMP-insoluble content (mass %) |  | 0.2 | 0.2 | 0.2 | 0.2 | 0.2 |
|  |  | Degree of swelling in electrolyte solution (mass %) |  | 120 | 120 | 120 | 120 | 120 |
|  |  | Amount (parts by mass) |  | 1 | 1 | 1.5 | 1.75 | 0.5 |
|  | Active material | Type |  | NMC | NMC | NMC | NMC | NMC |
|  |  | Amount (parts) |  | 97 | 97 | 97 | 97 | 97 |
|  | Conductive additive | Type |  | AB | AB | AB | AB | AB |
|  |  | Amount (parts) |  | 1 | 1 | 1 | 1 | 1 |
| Evaluation | Slurry composition solid content concentration |  |  | B | B | B | B | A |
|  | Electrode mixed material layer pressability |  |  | B | C | B | C | A |
|  | Electrode mixed material layer peel strength |  |  | C | C | A | A | C |
|  | Electrode mixed material layer flexibility |  |  | B | C | A | A | C |
|  | Secondary battery rate characteristics |  |  | C | C | B | B | B |
|  | Secondary battery cycle characteristics |  |  | B | B | A | A | B |

TABLE 2

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Shiny composition | Polymer A | Ethylenically unsaturated acid monomer | Type | MAA | MAA | — | — | MAA | — |
|  |  |  | Amount (parts) | 4.00 | 4.00 | — | — | 11.00 | — |
|  |  | Cross-linkable monomer | Type | — | — | — | EDMA | AMA | — |
|  |  |  | Amount (parts) | — | — | — | 1.00 | 0.80 | — |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | (Meth)acrylic acid ester monomer | BA (parts by mass) | 40.00 | — | 36.80 | — | 40.50 | — |
|  |  | MMA (parts by mass) | 56.00 | — | 5.30 | 36.50 | 47.70 | — |
|  |  | 2-EHA (parts by mass) | — | 40.00 | 42.10 | 41.70 | — | — |
|  |  | CHMA (parts by mass) | — | — | 15.80 | — | — | — |
|  | Nitrile group-containing monomer | AN (parts by mass) | — | — | — | — | — | — |
|  | Aromatic vinyl monomer | St (parts by mass) | — | 56.00 | — | 20.8 | — | — |
|  | Viscosity (mPa · s) | At shear rate of 0.1 (1/s) | 21,000 | >30,000 | >30,000 | 180 | 150 | — |
|  |  | At shear rate of 10 (1/s) | 4,000 | >30,000 | 4,500 | 80 | 40 | — |
|  | NMP-insoluble content (mass %) |  | 90 | 90 | 90 | 98 | 98 | — |
|  | Volume-average particle diameter (nm) |  | NA | NA | NA | 160 | 510 | — |
|  | Electrolyte solution-insoluble content (mass %) |  | 12 | 11 | 5 | <1 | <1 | — |
|  | Degree of swelling in electrolyte solution (mass %) |  | 600 | 500 | 160 | 140 | 130 | — |
|  | Glass-transition temperature (° C.) |  | 23 | 15 | −43 | 9 | 31 | — |
|  | Amount (parts by mass) |  | 1 | 1 | 1 | 1 | 1 | — |
| Polymer B | Type |  | PAN | PAN | PAN | PAN | PAN | PVdF |
|  | Viscosity (mPa · s; at shear rate of 10 (1/s)) |  | 5750 | 5750 | 5750 | 5750 | 5750 | 4830 |
|  | NMP-insoluble content (mass %) |  | 0.2 | 0.2 | 0.2 | 0.2 | 0.2 | 0.2 |
|  | Degree of swelling in electrolyte solution (mass %) |  | 120 | 120 | 120 | 120 | 120 | 120 |
|  | Amount (parts by mass) |  | 1 | 1 | 1 | 1 | 1 | 2.5 |
| Active material | Type |  | NMC | NMC | NMC | NMC | NMC | NMC |
|  | Amount (parts) |  | 97 | 97 | 97 | 97 | 97 | 96.5 |
| Conductive additive | Type |  | AB | AB | AB | AB | AB | AB |
|  | Amount (parts) |  | 1 | 1 | 1 | 1 | 1 | 1 |
| Evaluation | Slurry composition solid content concentration |  | D | D | D | B | A | D |
|  | Electrode mixed material layer pressability |  | A | D | C | C | C | B |
|  | Electrode mixed material layer peel strength |  | D | A | D | D | C | B |
|  | Electrode mixed material layer flexibility |  | C | D | C | C | D | B |
|  | Secondary battery rate characteristics |  | D | D | D | D | C | C |
|  | Secondary battery cycle characteristics |  | D | D | D | D | C | C |

It can be seen from Table 1 that in Examples 1 to 15 in which a binder composition containing a polymer A that included an ethylenically unsaturated acid monomer unit in a proportion of not less than 1.00 mass % and not more than 10.00 mass % and that had a viscosity of 10,000 mPa·s or less under specific conditions was used, it was possible to sufficiently increase the solid content concentration in a slurry composition, obtain an electrode mixed material layer having excellent peel strength, and provide a non-aqueous secondary battery having excellent battery characteristics such as rate characteristics and cycle characteristics. Moreover, it can be seen from Table 2 that good results such as those in Examples 1 to 15 could not be obtained in Comparative Examples 1 and 2 in which a binder composition containing a polymer that had a viscosity of more than 10,000 mPa·s under specific conditions was used, Comparative Example 3 in which a binder composition containing a polymer that did not include an ethylenically unsaturated acid monomer unit and that also did not satisfy the viscosity requirement was used, Comparative Example 4 in which a binder composition containing a polymer that did not include an ethylenically unsaturated acid monomer unit was used, Comparative Example 5 in which a binder composition containing a polymer that had an ethylenically unsaturated acid monomer unit content exceeding the upper limit was used, and Comparative Example 6 in which a binder composition that did not contain a polymer A was used.

Particularly in Comparative Examples 1 to 3, the polymer had a viscosity of more than 10,000 mPa·s under specific conditions and gelation thereof occurred in the organic solvent. It is thought that for this reason, the solid content concentration in a slurry composition could not be sufficiently increased.

INDUSTRIAL APPLICABILITY

According to the present disclosure, it is possible to provide a binder composition for a non-aqueous secondary battery electrode that when used in production of a slurry composition for a non-aqueous secondary battery electrode, enables a higher solid content concentration in the slurry composition.

Moreover, according to the present disclosure, it is possible to provide a slurry composition for a non-aqueous secondary battery electrode that has a high solid content concentration and can form an electrode mixed material layer having excellent peel strength.

Furthermore, according to the present disclosure, it is possible to provide an electrode for a non-aqueous secondary battery that can sufficiently improve battery characteristics of a non-aqueous secondary battery and also to provide a non-aqueous secondary battery that has excellent battery characteristics such as rate characteristics and cycle characteristics.

The invention claimed is:

1. A binder composition for a non-aqueous secondary battery electrode comprising a binder and an organic solvent, wherein
the binder includes a polymer A,
the polymer A includes an ethylenically unsaturated acid monomer unit in a proportion of not less than 1.00 mass % and not more than 10.00 mass %, and
the polymer A has a viscosity of 10,000 mPa·s or less at a shear rate of 0.1 s$^{-1}$ when mixed with the organic solvent in a concentration of 8 mass % to obtain a mixture.

2. The binder composition for a non-aqueous secondary battery electrode according to claim 1, wherein the polymer A includes a cross-linkable monomer unit in a proportion of not less than 0.01 mass % and not more than 5.00 mass %.

3. The binder composition for a non-aqueous secondary battery electrode according to claim 1, wherein the polymer A includes a (meth)acrylic acid ester monomer unit in a proportion of not less than 30.00 mass % and not more than 98.00 mass %.

4. The binder composition for a non-aqueous secondary battery electrode according to claim 1, wherein insoluble content of the polymer A when the polymer A is mixed with N-methyl-2-pyrrolidone in a concentration of 8 mass % is not less than 70 mass % and not more than 100 mass %.

5. The binder composition for a non-aqueous secondary battery electrode according to claim 1, wherein the polymer A has a volume-average particle diameter of not less than 100 nm and not more than 1,000 nm.

6. The binder composition for a non-aqueous secondary battery electrode according to claim 1, wherein
the binder further includes a polymer B, and
the polymer B has a viscosity of not less than 10 mPa·s and not more than 10,000 mPa·s at a shear rate of 10 s$^{-1}$ when dissolved in the organic solvent in a concentration of 8 mass % to obtain a solution.

7. The binder composition for a non-aqueous secondary battery electrode according to claim 6, wherein insoluble content of the polymer B when the polymer B is mixed with N-methyl-2-pyrrolidone in a concentration of 8 mass % is 50 mass % or less.

8. A slurry composition for a non-aqueous secondary battery electrode comprising an electrode active material and the binder composition for a non-aqueous secondary battery electrode according to claim 1.

9. An electrode for a non-aqueous secondary battery comprising an electrode mixed material layer formed using the slurry composition for a non-aqueous secondary battery electrode according to claim 8.

10. A non-aqueous secondary battery comprising the electrode for a non-aqueous secondary battery according to claim 9.

* * * * *